(12) United States Patent
Nefzger et al.

(10) Patent No.: US 7,091,304 B2
(45) Date of Patent: Aug. 15, 2006

(54) PROCESS FOR CLEANING PRODUCTION PLANTS FOR POLYESTER POLYOLS

(75) Inventors: Hartmut Nefzger, Pulheim (DE); Gerhard Klein, Monheim (DE); Erhard Michels, Cologne (DE); Ulrich Boddenberg, Leichlingen (DE)

(73) Assignee: Bayer Materialscience AG, Leverkusen (DE)

( * ) Notice: Subject to any disclaimer, the term of this patent is extended or adjusted under 35 U.S.C. 154(b) by 0 days.

(21) Appl. No.: 11/005,704

(22) Filed: Dec. 7, 2004

(65) Prior Publication Data

US 2005/0143555 A1 Jun. 30, 2005

(30) Foreign Application Priority Data

Dec. 11, 2003 (DE) .................................. 103 57 897

(51) Int. Cl.
*C08G 63/02* (2006.01)

(52) U.S. Cl. ...................... 528/272; 428/323; 428/328; 428/331; 428/339; 510/201; 510/240; 528/271

(58) Field of Classification Search ................ 428/323, 428/328, 331, 339; 510/201, 240; 528/271, 528/272

See application file for complete search history.

(56) References Cited

U.S. PATENT DOCUMENTS

| 2,364,387 A | 12/1944 | Peterson ...................... 260/78 |
| 5,782,989 A | 7/1998 | Rueter ...................... 134/22.19 |

FOREIGN PATENT DOCUMENTS

| DE | 1 133 212 | 7/1962 |
| DE | 1 143 375 | 2/1963 |
| DE | 59 670 | 7/1968 |

OTHER PUBLICATIONS

"Geothermal Steam For Glycol Plant", International Geothermal Conference, Reykjavik, Sep. 2003, Session #8.*

* cited by examiner

*Primary Examiner*—Terressa Boykin
(74) *Attorney, Agent, or Firm*—Joseph C. Gil; John E. Mrozinski, Jr.

(57) ABSTRACT

The present invention relates to a process for cleaning multi-product production plants for polyester polyols with a cleaning polyol. The cleaning polyol can be used as a raw material in the production of further polyols.

16 Claims, No Drawings

PROCESS FOR CLEANING PRODUCTION PLANTS FOR POLYESTER POLYOLS

FIELD OF THE INVENTION

The present invention relates to a process for cleaning multi-product production plants for polyester polyols, which are used for example to produce polyurethane materials.

BACKGROUND OF THE INVENTION

A characterizing feature of such multi-product production plants for polyester polyols is that a wide range of polyester polyols are produced in a limited number of reaction vessels, wherein the number of products produced normally exceeds the number of vessels available several times. Because undesired cross-contamination has to be avoided, the sequence, in which different polyester polyols may be produced in the same vessel is subject to certain constraints which may severely restrict allocation of resources. After production, the polyester polyols are transferred into tank trucks, storage vessels or drums via a fixed pipe system. Undesired cross-contamination of the various products must again be avoided at this point.

According to prior practices in such cases, a full cleaning operation has to be performed, by rinsing the vessel(s) and optionally the corresponding pipes with hot aqueous sodium or potassium hydroxide solution. This step is conventionally followed by a neutralization step using dilute acetic acid and a final rinsing process using water. These steps disadvantageously result in a worthless rinsing liquid, which has to be disposed off at considerable cost and has an impact on waste water treatment plants.

SUMMARY OF THE INVENTION

The present invention provides a process for cleaning multi-product production plants for polyester polyols which avoids these disadvantages. It has been found that the cleaning operation may advantageously be performed by treating the production plants with cleaning polyols at elevated temperature. In so doing, polyester polyol residues are removed from the production plants and the rinsing liquid (cleaning polyol) may then be used as a raw material for the production of polyester polyols.

These and other advantages and benefits of the present invention will be apparent from the Detailed Description of the Invention herein below.

DETAILED DESCRIPTION OF THE INVENTION

The present invention will now be described for purposes of illustration and not limitation. Except in the operating examples, or where otherwise indicated, all numbers expressing quantities, percentages and so forth in the specification are to be understood as being modified in all instances by the term "about."

The present invention provides a process for cleaning a multi-product polyester polyol production plant, in which the surfaces of the production plant which have been wetted with the product are treated with a cleaning polyol, preferably ethylene glycol and/or diethylene glycol, at temperatures of from 50 to 250° C., preferably 80 to 140° C. and pressures of from 50 mbar to 6 bar, preferably 700 to 1013 mbar. Treatment may proceed with the addition of an esterification or transesterification catalyst. However, it is preferable to dispense with the addition of catalysts.

The duration of the treatment depends on the ratios of residue to heated polyol, the temperature of the heated polyol, the consistency of the residue and the chemical structure thereof. In general, the duration is 15 minutes to six hours, wherein the amount of cleaning polyol used exceeds the amount of residue. Preferably, the amount of cleaning polyol amounts to more than three times the amount of residue, particularly preferably more than five times. In general, three hours is wholly sufficient for residues of any type, if the temperature of the heated cleaning polyol exceeds 100° C. and the ratios of cleaning polyol to residue are kept at more than 3:1.

Examples of residues from the production of polyester polyols which may be recovered and utilized with the process according to the invention are polycondensation products from:

a.1) saturated organic dicarboxylic acids of the general formula HOOC—$C_nH_{2n}$—COOH ($1 \leq n < 20$), preferably n=2 (succinic acid), n=3 (glutaric acid), n=4 (adipic acid) and n=5 (pimelic acid), particularly preferably glutaric acid (n=3) and adipic acid (n=4), or a.2) unsaturated organic dibasic carboxylic acids of the general formula HOOC—$C_nH_{2n-2}$—COOH ($1 < n < 20$), particularly preferably maleic acid (n=2) and fumaric acid (n=2), or a.3) aromatic dicarboxylic acids, particularly preferably phthalic acid, isophthalic acid and terephthalic acid, or a.4) dimer fatty acids, or a.5) fatty acids, or a.6) mixtures of a.1 to a.5, and polyols from the group of b.1) short-chain aliphatic diols, preferably with 2 to 12 C atoms, particularly preferably ethylene glycol, diethylene glycol, triethylene glycol, 1,2-propylene glycol, 1,3-propylene glycol, di- and tripropylene glycol, 1,4-butylene glycol, 1,5-pentamethylene glycol, neopentyl glycol, 1,6-hexamethylene glycol, 1,8-octamethylene glycol, 1,10-decamethylene glycol, 1,12-dodecamethylene glycol, or b.2) short-chain aliphatic polyols, preferably with 3–10 C atoms, particularly preferably glycerol, trimethylolpropane and pentaerythritol, or b.3) long-chain aliphatic polyols with number average molecular weights of from 180 to 5000 and number average functionalities of from 1.8 to 3.5, preferably 1.9 to 2.5, built up from at least one polyol from b.1 and b.2, used as starter polyol, together with ethylene and/or propylene oxide, or b.4) mixtures of b.1 to b.3.

The residues are predominantly terminated by hydroxyl groups and exhibit hydroxyl values of from 20 to 800, more preferably 25 to 500, most preferably 27 to 310; and have acid values of from 0.05 to 6, more preferably 0.1 to 3, most preferably 0.1 to 2.1 mg KOH/g. The residues may be amorphous or partially crystalline at room temperature, wherein the glass transition temperatures of the amorphous and partially crystalline types are between −80° C. and +100° C., more preferably between −60° C. and +70° C., most preferably between −40° C. and +50° C. Accordingly, the melting ranges of the partially crystalline types are between 0° C. and 120° C., more preferably between 10° C. and 80° C., most preferably between 15° C. and 75° C. The residues exhibit viscosity values of from 40 to 10,000 mPa·s (75° C.).

The cleaning polyol for the process according to the invention may in principle be any of the polyols listed under b., but preferably those listed under b.1) and particularly preferably ethylene glycol and diethylene glycol. A solution of the residues from polyester polyol production in polyol ("rinsing glycol") is obtained as the product of the process according to the invention. This generally exhibits an OH value of at least 750 mg KOH/g.

The rinsing glycol may be polycondensed with a substoichiometric carboxylic acid component, preferably those listed under a.1, particularly preferably adipic acid and/or glutaric acid, wherein the stoichiometric usage ratios determine the number average molar mass and the number average functionality. A catalyst is preferably used in this reaction step. The reaction proceeds in a manner known in principle to the person skilled in the art, at elevated temperature and with elimination of water.

It goes without saying that the rinsing glycol may be mixed prior to polycondensation with a further polyol, preferably those stated under b.1 and b.2, if there is a need to attain a particular polyol structure or a particular functionality. Admixing of a further polyol is usually unnecessary.

The polyester polyols obtained from rinsing glycol by polycondensation may advantageously be used as raw materials in polyurethane formulations.

EXAMPLES

Example 1

Cleaning of a Vessel Production of the Rinsing Glycol

A 15 m$^3$ vessel with appropriate cooling circuit, from which residues have been removed and in which a polybutylene adipate with a hydroxyl value of 56 mg KOH/g was produced, was filled with 2000 kg of ethylene glycol and agitated for 2 hours at 100° C. with recirculation. Cooling was performed and the rinsing glycol was collected.

Example 2

Production of a Polyester Polyol B1

7000 kg of rinsing glycol with a hydroxyl value of 1710 mg KOH/g was polycondensed with 12946 kg of industrial glutaric acid (average molar mass 133 g/mol) in a 20 m$^3$ vessel with elimination of water, ultimately in a vacuum at 225° C. The hydroxyl value was determined to be 56 mg KOH/g, the acid value to be 0.8 mg KOH/g.

Example 3

Production of a Polyurethane Molded Article using the Polyester Polyol B1

To produce polyurethane molded articles, an isocyanate group-containing A component (prepolymer DESMODUR PM 53, Bayer AG) at 45° C. was mixed in a low-pressure processing machine (PSA 95 made by Klöckner DESMA Schuhmaschinen GmbH) with a B component containing the polyester polyol B1 at 45° C., the mixture was introduced in metered manner into an aluminum mould held at 50° C. (size 200*200*10 mm), the mould was closed and after four minutes the elastomer was released from the mould. The hardness of the elastomer sheets produced in this way was measured after 24 hours of storage with a Shore A type hardness meter according to DIN 53 505.

The prepolymer A was processed as described with a polyol component B,

| | |
|---|---|
| 87.95 wt. % | polyester polyol B1 |
| 10.82 wt. % | ethanediol |
| 0.35 wt. % | diazabicyclo[2.2.2]octane |
| 0.88 wt. % | water. |

The mixing ratio of components B to A was 100:117 parts by weight, the resultant free foam density was 170 kg/m$^3$. The test pieces which it was possible to release from the mold after a mold residence time of four minutes had a molded article density of 350 kg/m$^3$ and exhibited a Shore A hardness of 52.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for cleaning a multi-product polyester polyol production plant, comprising:
   treating one or more surfaces of a reaction vessel and/or pipe in the production plant which have been wetted with residue from production of a polyester polyol with at least one cleaning polyol at temperatures of from about 80 to about 140° C. and pressures of from about 50 mbar to about 6 bar; and
   collecting the at least one cleaning polyol.

2. The process according to claim 1, wherein the pressure is from about 700 mbar to about 1013 mbar.

3. The process according to claim 1, wherein the amount of cleaning polyols is at least three times the amount of polyester polyol residue.

4. The process according to claim 1, wherein the amount of cleaning polyols is at least five times the amount of polyester polyol residue.

5. The process according to claim 1, wherein the cleaning polyol is chosen from ethylene glycol, diethylene glycol, triethylene glycol, 1,2-propylene glycol, 1,3-propylene glycol, di- and tripropylene glycol, 1,4-butylene glycol, 1,5-pentamethylene glycol, neopentyl glycol, 1,6-hexamethylene glycol, 1,8-octa-methylene glycol, 1,10-decamethylene glycol, 1,12-dodecamethylene glycol, glycerol, trimethylolpropane, pentaerythritol and mixtures thereof.

6. A process for the production of a polyester polyol comprising:
   treating one or more surfaces of a reaction vessel and/or pipe which have been wetted with residue from production of a polyester polyol with at least one cleaning polyol at temperatures of from about 50 to about 250° C. and pressures of from about 50 mbar to about 6 bar; and
   producing a polyester polyol by polycondensing the at least one cleaning polyol with a substoichiometric amount of a carboxylic component.

7. The process according to claim 6, wherein the cleaning polyol is chosen from ethylene glycol, diethylene glycol, triethylene glycol, 1,2-propylene glycol, 1,3-propylene glycol, di- and tripropylene glycol, 1,4-butylene glycol, 1,5-pentamethylene glycol, neopentyl glycol, 1,6-hexamethylene glycol, 1,8-octamethylene glycol, 1,10-decamethylene glycol, 1,12-dodecamethylene glycol, glycerol, trimethylolpropane, pentaerythritol and mixtures thereof.

8. The process according to claim 6, wherein the cleaning polyol is chosen from ethylene glycol and diethylene glycol.

9. The process according to claim 6, wherein the carboxylic component is chosen from saturated organic dicarboxylic acids of the formula HOOC—$C_nH_{2n}$—COOH ($1 \leq n < 20$), unsaturated organic dibasic carboxylic acids of the formula HOOC—$C_nH_{2n-2}$—COOH ($1 < n < 20$), aromatic dicarboxylic acids, dimer fatty acids, fatty acids and mixtures thereof.

10. The process according to claim 6, wherein the carboxylic component is chosen from succinic acid, glutaric acid, adipic acid, pimelic acid, maleic acid, fumaric acid, phthalic acid, isophthalic acid and terephthalic acid.

11. The process according to claim 6, wherein the carboxylic component is chosen from glutaric acid and adipic acid.

12. The process according to claim 6, wherein the temperature is from about 80 to about 140° C.

13. The process according to claim 6, wherein the pressure is from about 700 mbar to about 1013 mbar.

14. The process according to claim 6, wherein the amount of cleaning polyols is at least three times the amount of polyester polyol residue.

15. The process according to claim 6, wherein the amount of cleaning polyols is at least five times the amount of polyester polyol residue.

16. In a process for the production of a polyurethane, the improvement comprising including the polyester polyol produced by the process according to claim 6.

* * * * *